US012711268B2

(12) United States Patent
Mung et al.

(10) Patent No.: US 12,711,268 B2
(45) Date of Patent: Aug. 18, 2026

(54) SYSTEM AND METHOD FOR DATA MANAGEMENT IN A VEHICLE

(71) Applicant: Continental Automotive Technologies GmbH, Hannover (DE)

(72) Inventors: Khup Khawm Mung, Singapore (SG); Yi Wang, Singapore (SG)

(73) Assignee: AUMOVIO Germany GmbH, Frankfurt am Main (DE)

( * ) Notice: Subject to any disclaimer, the term of this patent is extended or adjusted under 35 U.S.C. 154(b) by 194 days.

(21) Appl. No.: 18/575,492

(22) PCT Filed: Jun. 24, 2022

(86) PCT No.: PCT/EP2022/067388
§ 371 (c)(1),
(2) Date: Dec. 29, 2023

(87) PCT Pub. No.: WO2023/274883
PCT Pub. Date: Jan. 5, 2023

(65) Prior Publication Data

US 2024/0320368 A1 Sep. 26, 2024

(30) Foreign Application Priority Data

Jun. 29, 2021 (GB) ...................................... 2109312

(51) Int. Cl.
*G06F 21/62* (2013.01)
*B60W 50/08* (2020.01)

(52) U.S. Cl.
CPC ......... *G06F 21/6245* (2013.01); *B60W 50/08* (2013.01); *B60W 2540/043* (2020.02); *B60W 2556/10* (2020.02); *G06F 2221/2143* (2013.01)

(58) Field of Classification Search
CPC ......... G06F 21/6245; G06F 2221/2143; G06F 21/79; B60W 50/08; B60W 2540/043;
(Continued)

(56) References Cited

U.S. PATENT DOCUMENTS

| | | | | |
|---|---|---|---|---|
| 11,157,648 | B1 * | 10/2021 | Amico | G06F 21/73 |
| 11,748,510 | B1 * | 9/2023 | Beveridge | G06F 21/6245 726/27 |

(Continued)

FOREIGN PATENT DOCUMENTS

| | | |
|---|---|---|
| KR | 20150054072 A | 5/2015 |
| KR | 101561979 B1 | 10/2015 |
| WO | 2020010192 A1 | 1/2020 |

OTHER PUBLICATIONS

Search Report for dated Mar. 17, 2022 for the priority Great Britain Application No. 2109312.5.

(Continued)

*Primary Examiner* — Mohammad W Reza

(57) ABSTRACT

To improve user data management in vehicles, a computer-implemented method, for deletion of data in a data storage of a vehicle having an HSM, includes: a) a user causing an HMI to generate an erase command for private data that is suitable to personally identify the user; b) transmitting the erase command to an ECU of the vehicle; c) identifying the user by checking a user ID stored in a user ID database and determining the existence of the user ID and, if the user ID is determined to exist, continuing in step d), otherwise continuing in step e); d) generating a request for destruction of an encryption key that is associated with the user ID and sending said request to the HSM and the HSM destroying the encryption key; and e) delete the private data indicated by the user.

8 Claims, 5 Drawing Sheets

(58) Field of Classification Search
CPC ......... B60W 2556/10; B60W 2756/00; B60W 50/00
See application file for complete search history.

(56) References Cited

U.S. PATENT DOCUMENTS

| | | | | |
|---|---|---|---|---|
| 2012/0155636 | A1* | 6/2012 | Muthaiah | H04L 9/0825 380/44 |
| 2014/0237576 | A1* | 8/2014 | Zhang | G06F 21/32 726/7 |
| 2020/0213287 | A1 | 7/2020 | Zhang | |

OTHER PUBLICATIONS

The International Search Report and the Written Opinion of the International Searching Authority mailed on Oct. 11, 2022 for the PCT Application No. PCT/EP2022/067388 for which this application claims priority.

Yajun Kou et al. "F.VM-VMA Architecture of vehicular multimedia systems" International Telecommunication Union, vol. 27/16, Apr. 28, 2021 (Apr. 28, 2021), pp. 1-34, XP044314946.

* cited by examiner

SYSTEM AND METHOD FOR DATA MANAGEMENT IN A VEHICLE

CROSS-REFERENCE TO RELATED APPLICATIONS

The present application is a National Stage Application under 35 U.S.C. § 371 of International Patent Application No. PCT/EP2022/067388 filed on Jun. 24, 2022, and claims priority from United Kingdom Application No. 2109312.5 filed on Jun. 29, 2021, in the United Kingdom Intellectual Property Office, the disclosures of which are herein incorporated by reference in their entireties.

TECHNICAL FIELD

The invention generally relates to computer implemented methods for data management in a vehicle and a corresponding system. More specifically the invention relates to a computer implemented method for deletion of data in a data storage of a vehicle.

BACKGROUND

There have long been remote services for cars with connectivity to perform multiple tasks that include remote engine start, remote door lock-unlock and many more. The user is able to use his or her mobile phone or a web portal to interact with his or her car and sending remote command and receiving information for both personal consumption.

While existing remote features are focusing on giving users convenience and improving lives of users they have not addressed issues that might arise at the cost of these benefits. Especially when it comes to data protection compliance (such as required by the General Data Protection Regulation, hereafter: GDPR, of the European Union), some of the remote features do not provide sufficient protection for the user to keep his or her privacy at all.

KR 10-1561979 discloses deleting a user's personal information via communication using a terminal.

KR 10-2015-0054072 discloses a utilization of a unique key of the user to delete the private data.

Some of the remote telematic features allow vehicle users or fleet operators to record their travel history, the benefits of which are not subject of this description. However, there is a privacy risk that is associated with the data collected to enable these services. While users may be able to remove data from the cloud services where the data are hosted after collecting from telematic control unit. There are also data stored in the flash memory are of the electronic control unit (hereafter: ECU). There is no chance for a user to remove these data actively at their convenient time. This could be a potential GDPR compliance issue.

There is therefore a need for measures that enable a user to actively participate in managing his or her own data at the ECU level if his or her car is equipped with the corresponding instrument and services.

BRIEF SUMMARY

It is the object of the invention to improve user data management in vehicles.

The invention provides a computer implemented method for deletion of data in a data storage of a vehicle having an HSM, the method comprising:

a) a user causing an HMI to generate an erase command for data that is suitable to personally identify the user;

b) transmitting the erase command to an ECU of the vehicle;

c) identifying the user by checking a user ID stored in a user ID database and determining the existence of the user ID and, if the user ID is determined to exist, continuing in step d), otherwise continuing in step e);

d) generating a request for destruction of an encryption key that is associated with the user ID and sending said request to the HSM and the HSM destroying the encryption key; and e) delete the data indicated by the user.

Preferably, in step a) the HMI comprises a head unit installed in the vehicle, and the user interacts with the head unit to generate the erase command. Preferably, in step b) the erase command is transmitted from the head unit to the ECU using a communication channel within the vehicle.

Preferably, in step a) the HMI comprises a web site hosted by a TSP, and the user interacts with the web site to generate the erase command. Preferably, in step b) the erase command is transmitted from the web site via internet to a TSP, relayed to a TCU of the vehicle via a cellular network, and passed on to the ECU.

Preferably, in step a) the HMI comprises a mobile application running on a personal device, and the user interacts with the mobile application to generate the erase command. Preferably, in step b) the erase command is transmitted from the mobile application via internet or via a cellular network.

The invention provides a method for registering a user in a user ID database of a vehicle such that the user is able to perform a previously described method, the method comprising:

a) the user selecting, whether a privacy feature is enabled; and b) if the privacy feature is enabled, generating an encryption key and storing the encryption key in the HSM, generating a key ID that is indicative of the encryption key and a user ID that is indicative of the user, associating the key ID with the user ID, and storing the pair of key ID and user ID in the user ID database, otherwise storing the user in a user list of the user ID database.

The invention provides a method for in-vehicle data encryption such that a user is able to perform a previously described method, the method comprising:

a) determining for a piece of in-vehicle data, whether the in-vehicle data include privacy information or not; and b) if the in-vehicle data are determined to include privacy information, retrieving from a user ID database a user ID corresponding to a current user and an associated key ID, encrypting the in-vehicle data by the HSM based on the retrieved key ID, and storing the encrypted in-vehicle data in a data storage, otherwise storing the in-vehicle data unencrypted in the data storage.

The invention provides a method for data management in a vehicle, the method comprising:

a) performing a method for registering a user;

b) performing a method for in-vehicle data encryption; and c) performing a method for deletion of data, each as previously described.

The invention provides a system for data management in a vehicle, the system comprising an HMI configured for user interaction, a vehicle having a TCU, an HSM, and an ECU, wherein the TCU is configured for transmitting and receiving commands, the HSM is configured to perform cryptography, and the ECU is configured for controlling the components of the system, wherein the system as a whole is configured to perform a preferred method.

The invention provides a computer program, or a computer readable storage medium, or a data signal comprising instructions, which upon execution by a data processing device cause the device to perform one, some, or all of the steps of a previously described method.

The measures described above allow a concerned user to revoke access to his or her data on an ECU at any such time that he or she thinks it is appropriate to do so. The user can launch the mobile application that has the remote-revoke and by pressing the corresponding erase button an erase command is sent to his or her remote service provider requesting to revoke the data of interest.

The backend and the ECU may initiate communication and transporting the command in a manner known per se. It is possible to have multiple approaches in transporting the command to and from the ECU.

One idea is about leveraging existing remote services and platforms to bring security and privacy for the user at his or her finger tip. Advantages include but are not limited to:

1. Real-time protection of privacy as soon as receiving the instruction.
2. Real encrypted privacy information can be revoked later after the corresponding keys are deleted.
3. The two points above lead to real-time processing with privacy data with little overhead (only key is revoked) and provide time margin to process privacy information.

Leveraging on existing remote services and platform, the proposed solution will enhance user privacy and satisfaction when participating in connected services.

It is not enough for the user to inform his or her service provider to revoke privacy data and this service would allow user to control their data in the car directly.

A user as understood herein is someone who owns or drive a car that is equipped with connectivity and remote services that requires collecting and storing of privacy related data belong to him or her.

A user can interact with the remote-revoke service via a multiple human-machine interface. When the user is in the car, he or she can use the head unit as an interface to perform data erasure by pressing a menu button that is linked to the remote-revoke service.

The proposed methods work in the following steps:

Step 1: A user accesses the revoke service via a human machine interface (hereafter: HMI). Preferably, the user accesses the remote-revoke service via the head unit to revoke his or her personal data. Preferably, the user accesses the remote-revoke from a website that may be hosted by a service provider to request revoke of his or her personal data. Preferably, the user accesses the remote-revoke service from his or her mobile application developed by his or her service provider to request to revoke his or her personal data.

Step 2: The request is transmitted from the HMI to the ECU. Preferably, the request is transmitted from the head unit to the ECU via a communication channel that is arranged within the vehicle. Preferably, the requests is transmitted as a web request from a web site provided by a telematic service provider (hereafter: TSP) via internet. The web request is preferably relayed to the telematic control unit (hereafter: TCU) of the vehicle via a mobile network operator (hereafter: MNO). The request may be sent from a mobile application, e.g. on a smartphone, to the TSP via the MNO and subsequently relayed to the TCU again via the MNO.

Step 3: The TCU receives the revoke command from the HMI, or from the web site or mobile application via the MNO.

Step 4: The TCU executes the revoke operation.

The solution presented enables products that store privacy information such that the requirements of the GDPR are met, namely:

- data confidentiality: privacy data at rest is encrypted with a cryptographic key that is stored in a hardware security module (hereafter: HSM)
- right to erasure: it allows users to revoke privacy in real-time
- data protection: both encryption and secure revoke enables data protection
- secure processing: privacy data is encrypted at rest From a service provider or OEM point of view, the proposed solution can be integrated to existing services as an additional feature.

As for the users, it allows them to instantly revoke privacy data stored in their vehicles three different ways without having to contact any third-party.

A user specific encryption key is generated when a new vehicle user is registered with a vehicle application. If the new user enables a privacy feature a new encryption key is generated within an HSM and stored therein securely.

Furthermore, a key ID is generated by the HSM, paired with a user ID, and stored in a user database. If the privacy feature is not enabled, new user registered follow normal process.

List of privacy data shall be determined by vehicle manufacturers that may include location information, personally identifiable information (hereafter: PII) and any information that qualifies it to be PII. An algorithm that may be a machine learning or artificial intelligence based algorithm or a simple filtering of information are used to separate PII from non-PII. Every piece of information to be stored that is determined to be privacy related is encrypted inside HSM using the key ID associated with the appropriate user to identify the correct encryption key which the encryption process retrieves from user database.

When the user chooses to delete his or her own privacy data, the tool will first identify the user and determine if there is any key ID associated with the user from user database. If there exists a key ID for the user, a request to the HSM is made to revoke the encryption key associated with key ID presented. If there is no key ID associated with the user, a normal file deletion is performed.

BRIEF DESCRIPTION OF THE DRAWINGS

Embodiments of the invention are described in more detail with reference to the accompanying schematic drawings.

DETAILED DESCRIPTION

Figure 1:
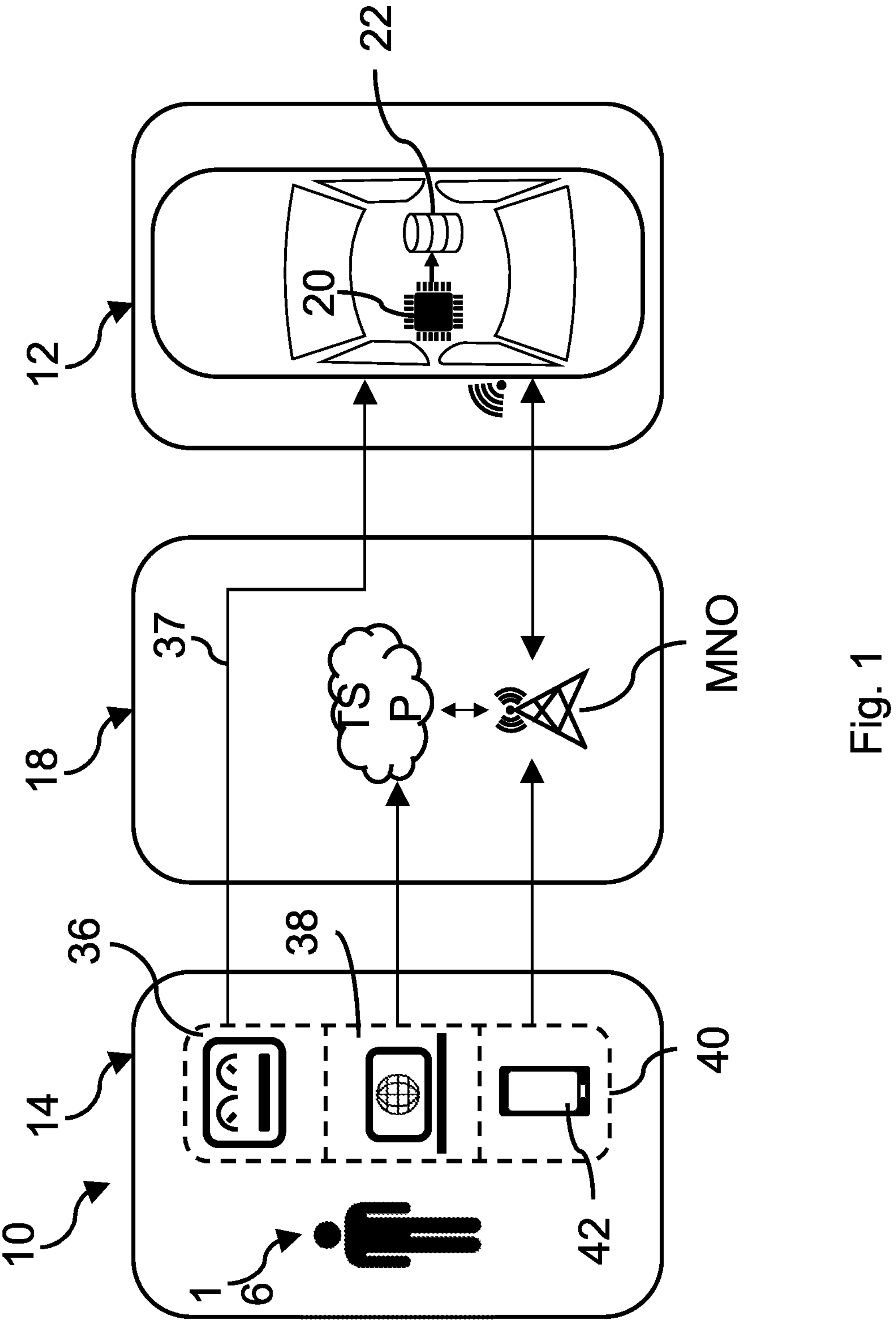
FIG. 1 depicts an embodiment of a system according to the invention.

FIG. 1 depicts a system 10 for data management in a vehicle 12. The system 10 comprises the vehicle 12. The system 10 comprises an HMI 14 with which a user 16 (generally one or more users) may interact. The system 10 further comprises a communication infrastructure 18 which allows communication between the HMI 14 and the vehicle 12.

The vehicle 12 comprises a TCU 20 which communicates using the communication infrastructure 18. The vehicle 12 further comprises a data storage 22 for storing all sorts of data including user related data (seat pre-sets, etc.), PII data that may help identifying a specific user 16, and in-vehicle data (such as travel routes).

Figure 2:
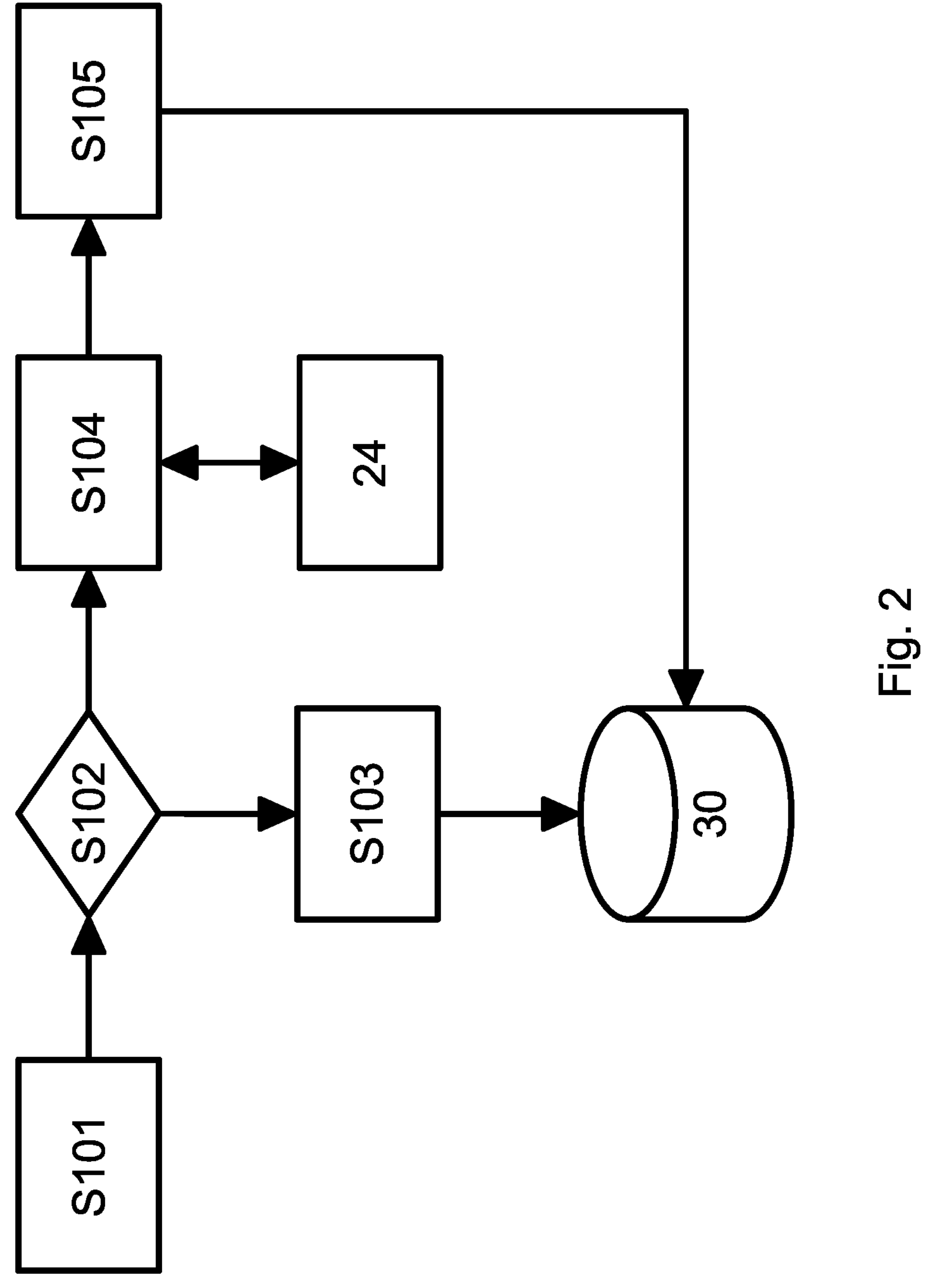
FIG. 2 depicts an embodiment of a method for registering a user.
Figure 3:
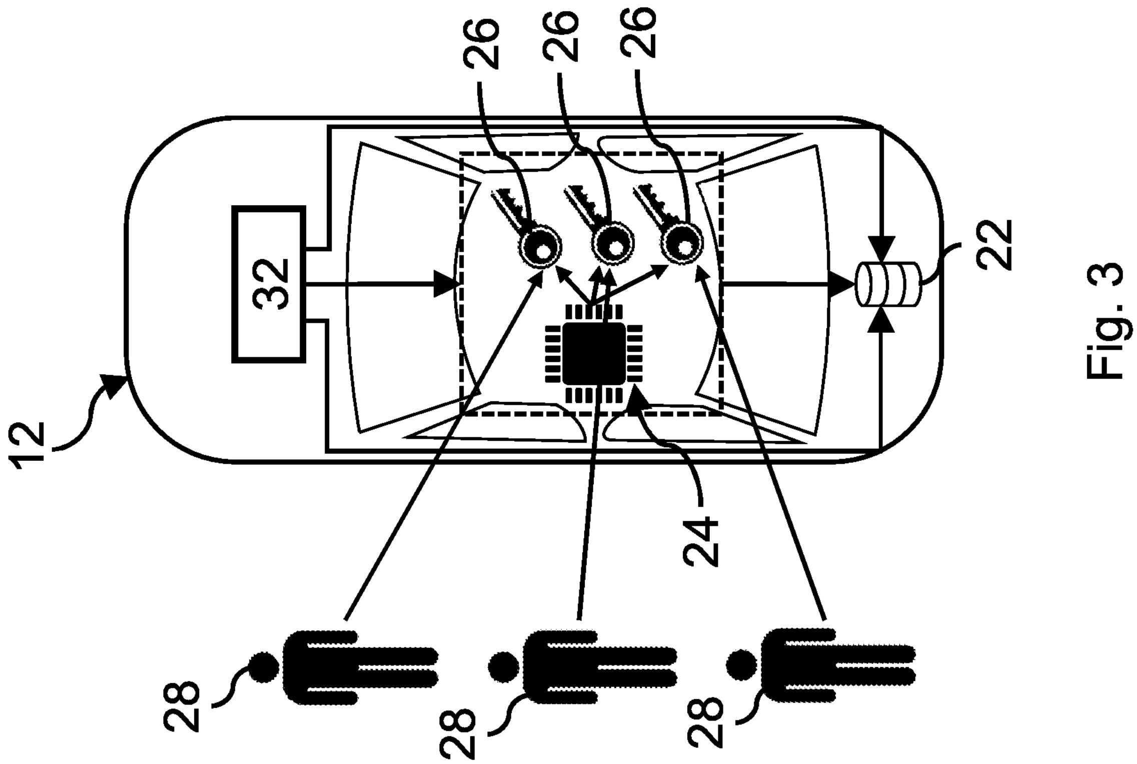
FIG. 3 depicts a vehicle according to the invention when registering a new user.

Referring to FIG. 2 and FIG. 3, the vehicle 12 comprises an HSM 24 that is able to generate and store encryption keys 26.

In an initial step S101, a new user 28 interacts with the HMI 14 so that the new user 28 should be added to the users 16 of the vehicle 12.

In a step S102, the new user 28 is then queried, whether he or she wishes to enable a privacy feature.

If the privacy feature is not enabled by the new user 28, then, in a step S103, the new user 28 is added to a list of current users stored in a user ID database 30.

If the privacy feature is enabled by the new user 28, then, in a step S104, the HSM 24 generates an encryption key and a key ID that identifies the encryption key just generated. The encryption key is stored in the HSM 24 to be secure. In a step S105, a user ID is generated and paired with the key ID, which are stored as a pair in the user ID database 30. Hence, each user 16 that has opted to enable the privacy feature has a user ID and an associated key ID, which indicates the encryption key specific to that specific user 16.

Figure 6:
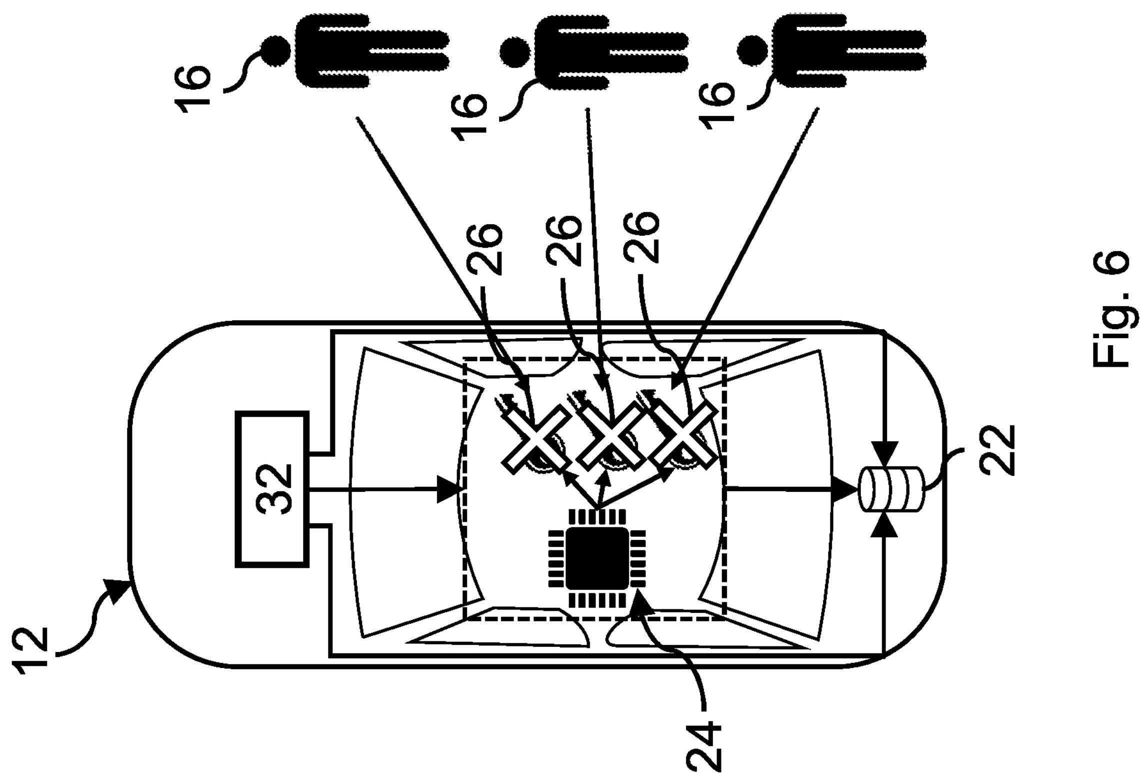
FIG. 6 depicts a vehicle according to the invention when a user revokes access.
Figure 4:
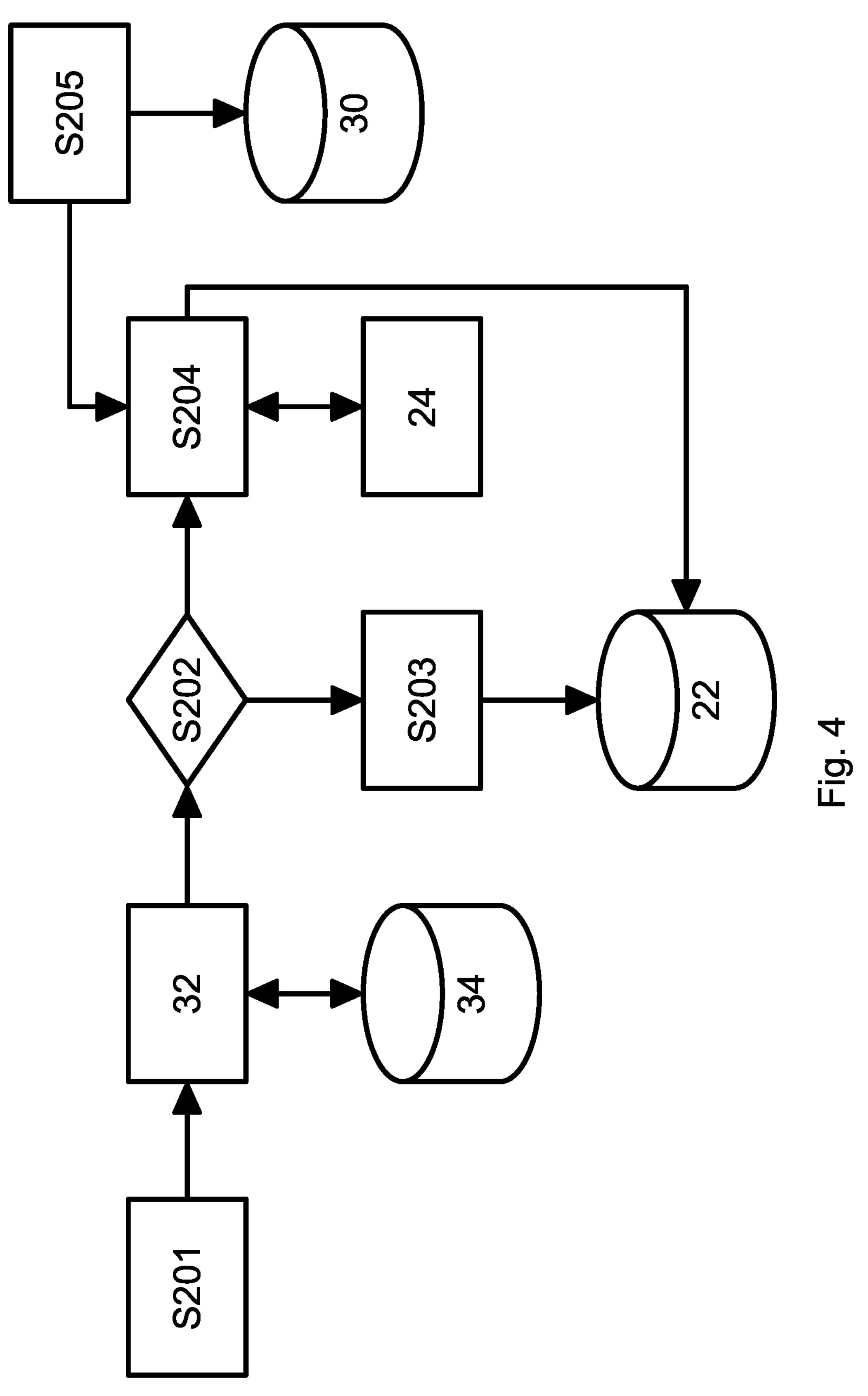
FIG. 4 depicts an embodiment of a method for encrypting user data.

Referring to FIG. 3, FIG. 4, and FIG. 6, the vehicle 12 also may comprise a privacy data determination module 32, that is configured to determine whether data gathered by the vehicle 12, i.e. in-vehicle data, such as navigational data, travel routes, etc., include PII. The privacy determination module 32 may be implemented using machine learning algorithms or using filters having selectors that allow determination whether data is PII or not. The privacy determination module 32 may include a privacy database 34 that stores the machine learning data or the filters.

In a step S201 the vehicle 12 gathers in-vehicle data.

The in-vehicle data are then fed to the privacy determination module 32 in a step S202 in which it is determined, whether and which parts of the in-vehicle data are PII.

In a step S203, the in-vehicle data that are determined to be non-PII are stored in the data storage 22 unencrypted.

In a step S204 the PII data are encrypted, by identifying the user 16 in a step S205, and retrieving the pair of user ID and key ID from the user ID database 30. Then the HSM 24 encrypts the PII using the user specific encryption key. Subsequently, the encrypted PII are stored in the data storage 22.

Figure 5:
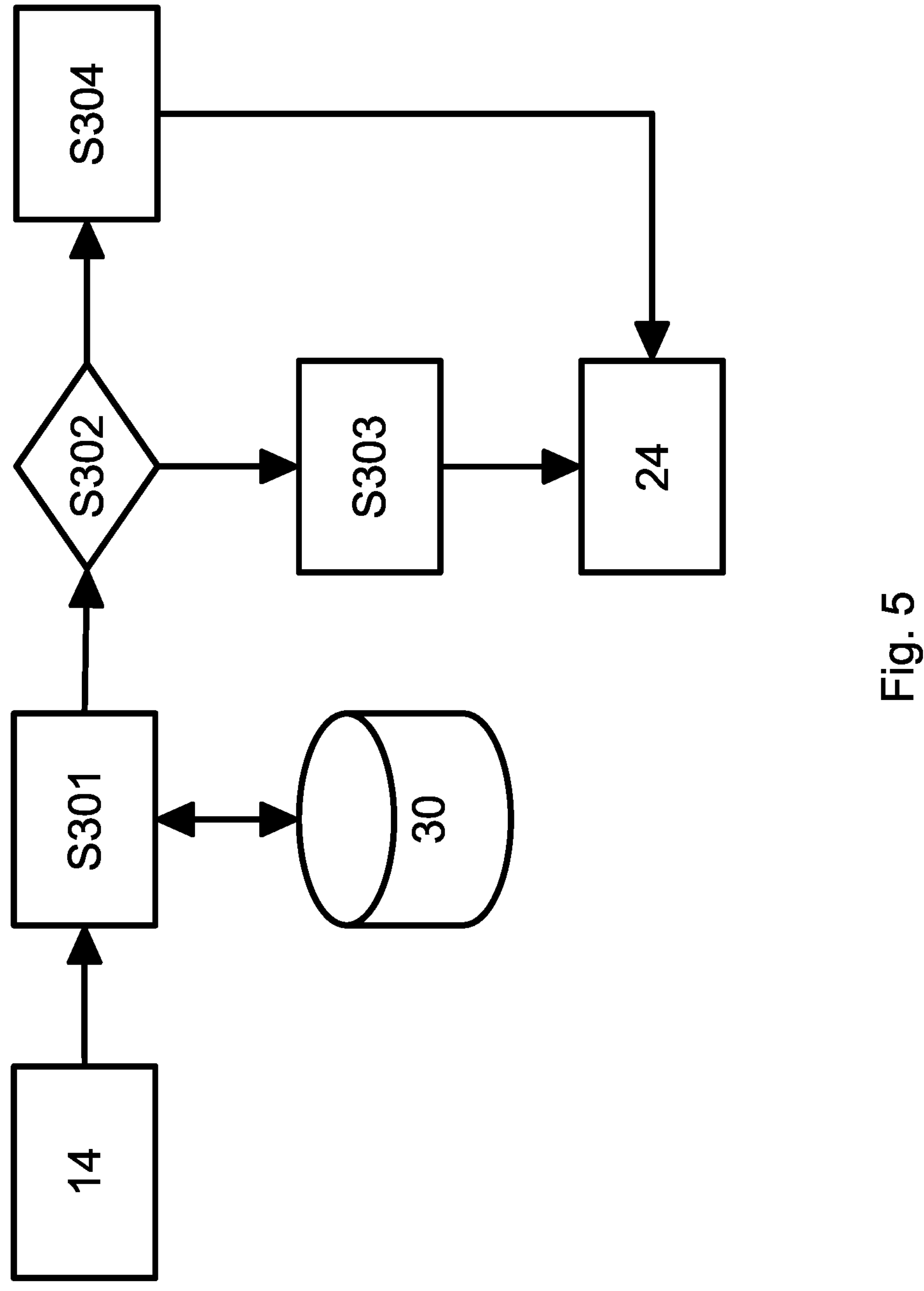
FIG. 5 depicts an embodiment of a method for deletion of user related data.

Referring to FIG. 5 and FIG. 6, a method for deleting data that is related to a specific user 16 is described.

The user 16 interacts with the HMI 14 and causes it to generate an erase command. The HMI 14 may be any of a head unit 36, a web site 38, or a mobile application 40 running on a personal device 42, such as a smartphone. In case of the head unit 36, the erase command is transmitted to the ECU by a vehicle internal communication channel 37. In case of the web site 38, the erase command is transmitted via internet to a TSP, which relays the erase command to the TCU 20 via a cellular network using an MNO. In case of the mobile application 40, the erase command may be transmitted via cellular network to an MNO and from there to the TCU 20 again via cellular network.

In a step S301, the user 16 is identified by checking whether the associated user ID is stored in the user ID database 30.

Furthermore, in a step S302 it is determined whether a key ID is paired with the user ID retrieved in step S301. If so, then in a step S303 a key destruction request is sent to the HSM 24, which destroys the encryption key associated with the user ID.

Subsequently, in a step S304 all data (PII or non-PII) associated with the user ID is deleted.

If in step S302 it is determined that there is no key ID associated with the user ID, then the method goes to step S304.

As a result, the user 16 is able to delete all PII and non-PII data related to him or her remotely and without delay.

REFERENCE SIGNS

- 10 system
- 12 vehicle
- 14 HMI
- 16 user
- 18 communication infrastructure
- 20 TCU
- 22 data storage
- 24 HSM
- 26 encryption key
- 28 new user
- 30 user ID database
- 32 privacy data determination module
- 34 privacy database
- 36 head unit
- 37 internal communication channel
- 38 web site
- 40 mobile application
- 42 personal device
- S101 . . . S105 steps for registering
- S201 . . . S205 steps for encrypting
- S301 . . . S304 steps for deleting

The invention claimed is:

1. A computer implemented method for deletion of data in a data storage of a vehicle having a hardware security module (HSM), the method comprising:

a) a user causing a human machine interface (HMI) to generate an erase command for private data that is suitable to personally identify the user;

b) transmitting the erase command to an electronic control unit (ECU) of the vehicle;

c) identifying the user by checking a user ID stored in a user ID database and determining the existence of the user ID and, if the user ID is determined to exist, continuing in step d), otherwise continuing in step e);

d) generating a request for destruction of an encryption key that is stored in the HSM and that is associated with the user ID and sending said request to the HSM and the HSM destroying the encryption key; and e) delete the private data indicated by the user.

2. The method according to claim 1, characterized in that in step a) the HMI comprises a head unit installed in the vehicle, and the user interacts with the head unit to generate the erase command, and in step b) the erase command is transmitted from the head unit to the ECU using a communication channel within the vehicle.

3. The method according to claim 1, characterized in that in step a) the HMI comprises a web site hosted by a telematic service provider (TSP), and the user interacts with the web site to generate the erase command, and in step b) the erase command is transmitted from the web site via internet to a TSP, relayed to a telematic control unit (TCU) of the vehicle via a cellular network, and passed on to the ECU.

4. The method according to claim 1, characterized in that in step a) the HMI comprises a mobile application running on a personal device, and the user interacts with the mobile application to generate the erase command, and in step b) the erase command is transmitted from the mobile application via internet or via a cellular network.

5. A method for registering a user in a user ID database of a vehicle such that the user is able to delete data in a data storage of a vehicle having a hardware security module (HSM), the method comprising:

a) a user causing a human machine interface (HMI) to generate an erase command for private data that is suitable to personally identify the user;

b) transmitting the erase command to an electronic control unit (ECU) of the vehicle;

c) identifying the user by checking a user ID stored in a user ID database and determining the existence of the user ID and, if the user ID is determined to exist, continuing in step d), otherwise continuing in step e);

d) generating a request for destruction of an encryption key that is stored in the HSM and that is associated with the user ID and sending said request to the HSM and the HSM destroying the encryption key; and e) delete the private data indicated by the user, f) the user selecting whether a privacy feature is enabled; and g) if the privacy feature is enabled, generating an encryption key and storing the encryption key in the HSM, generating a key ID that is indicative of the encryption key and a user ID that is indicative of the user, associating the key ID with the user ID, and storing the pair of key ID and user ID in the user ID database, otherwise storing the user in a user list of the user ID database.

6. A method for in-vehicle data encryption such that a user is able to delete data in a data storage of a vehicle having a hardware security module (HSM), the method comprising:

a) a user causing a human machine interface (HMI) to generate an erase command for private data that is suitable to personally identify the user;

b) transmitting the erase command to an electronic control unit (ECU) of the vehicle;

c) identifying the user by checking a user ID stored in a user ID database and determining the existence of the user ID and, if the user ID is determined to exist, continuing in step d), otherwise continuing in step e);

d) generating a request for destruction of an encryption key that is stored in the HSM and that is associated with the user ID and sending said request to the HSM and the HSM destroying the encryption key; and e) delete the private data indicated by the user, f) determining for a piece of in-vehicle data, whether the in-vehicle data include privacy information or not; and g) if the in-vehicle data are determined to include privacy information, retrieving from a user ID database a user ID corresponding to a current user and an associated key ID, encrypting the in-vehicle data by the HSM based on the retrieved key ID, and storing the encrypted in-vehicle data in a data storage, otherwise storing the in-vehicle data unencrypted in the data storage.

7. The method according to claim 5, further comprising:

h) determining for a piece of in-vehicle data, whether the in-vehicle data include privacy information or not; and i) if the in-vehicle data are determined to include privacy information, retrieving from a user ID database a user ID corresponding to a current user and an associated key ID, encrypting the in-vehicle data by the HSM based on the retrieved key ID, and storing the encrypted in-vehicle data in a data storage, otherwise storing the in-vehicle data unencrypted in the data storage.

8. A system for data management in a vehicle, the system comprising a human machine interface (HMI) configured for user interaction, a vehicle having a telematic control unit (TCU), a hardware security module (HSM), and an electronic control unit (ECU), wherein the TCU is configured for transmitting and receiving commands, the HSM is configured to perform cryptography, and the ECU is configured for controlling the components of the system, characterized in that the system as a whole is configured to delete data in a data storage of the vehicle, the method comprising:

a) a user causing the HMI to generate an erase command for private data that is suitable to personally identify the user;

b) transmitting the erase command to the ECU of the vehicle;

c) identifying the user by checking a user ID stored in a user ID database and determining the existence of the user ID and, if the user ID is determined to exist, continuing in step d), otherwise continuing in step e);

d) generating a request for destruction of an encryption key that is stored in the HSM and that is associated with the user ID and sending said request to the HSM and the HSM destroying the encryption key; and e) delete the private data indicated by the user.

* * * * *